United States Patent
Huang et al.

(10) Patent No.: US 8,250,322 B2
(45) Date of Patent: Aug. 21, 2012

(54) COMMAND REORDERING BASED ON COMMAND PRIORITY

(75) Inventors: Ming Chuan Huang, Jhubei (TW); Chia Hao Lee, Tainan (TW); Han Liang Chou, Baoshan Township, Hsinchu County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 500 days.

(21) Appl. No.: 12/635,828

(22) Filed: Dec. 11, 2009

(65) Prior Publication Data
US 2010/0153636 A1    Jun. 17, 2010

(51) Int. Cl.
*G06F 13/18*    (2006.01)
(52) U.S. Cl. .................. 711/158; 711/105; 711/167
(58) Field of Classification Search .......... None
See application file for complete search history.

(56) References Cited

U.S. PATENT DOCUMENTS

| | | | |
|---|---|---|---|
| 6,683,816 B2 | 1/2004 | Emmot et al. | |
| 7,958,324 B2 * | 6/2011 | Tokoro et al. | 711/158 |
| 2008/0288731 A1 * | 11/2008 | Izumi | 711/160 |
| 2010/0023712 A1 * | 1/2010 | Yamaguchi et al. | 711/158 |

FOREIGN PATENT DOCUMENTS

CN    1723447 A    1/2006

* cited by examiner

Primary Examiner — Than Nguyen
(74) Attorney, Agent, or Firm — Bacon & Thomas, PLLC (57) ABSTRACT

A control system for memory access includes a system memory access command buffer, a memory access command parallel processor, a DRAM command controller and a read data buffer. The system memory access command buffer stores plural system memory access commands. The memory access command parallel processor is connected to the system memory access command buffer for fetching and decoding the system memory access commands to plural DRAM access commands, storing the DRAM access commands in DRAM bank command FIFOs, and performing priority setting according to a DRAM bank priority table. The DRAM command controller is connected to the memory access command parallel processor and a DRAM for receiving the DRAM access commands, and sending control commands to the DRAM. The read data buffer is connected to the DRAM command controller and the system bus for storing the read data and rearranging a sequence of the read data.

14 Claims, 10 Drawing Sheets

COMMAND REORDERING BASED ON COMMAND PRIORITY

BACKGROUND OF THE INVENTION

1. Field of the Invention

The invention relates to the technical field of DRAM (Dynamic Random Access Memory) access and, more particularly, to a control system and method for synchronous DRAM access.

2. Description of Related Art

With the progress of semiconductor technology, the access speed of DRAM has improved gradually. In past twenty years, the access speed of DRAM has increased from several MHz to several GHz, and the number of latency cycles of non-active bank memory access has increased gradually. For example, the number of latency cycles of non-active bank memory access in SDR is 3 to 5, and the numbers of latency cycles of non-active bank memory access in DDR-II and DDR-III are 12 to 25.

A computer system or an image processing system comprises various system bus masters. Each system bus master has a specific function, such as video decoding, video encoding, video display, audio signal decoding, audio signal play, DMA, etc. Since each system bus master executes the specific function, the system masters respectively access memory at inconsistent address range and command format at the same time. Thus, those DRAM commands will be accessed to different DRAM banks, pages and column address range. Since various system bus masters request the memory accesses that are for different data processing purpose or flow control of software program, it is difficult to find the same active page using in the previous memory access command and the following memory access command.

Figure 1:
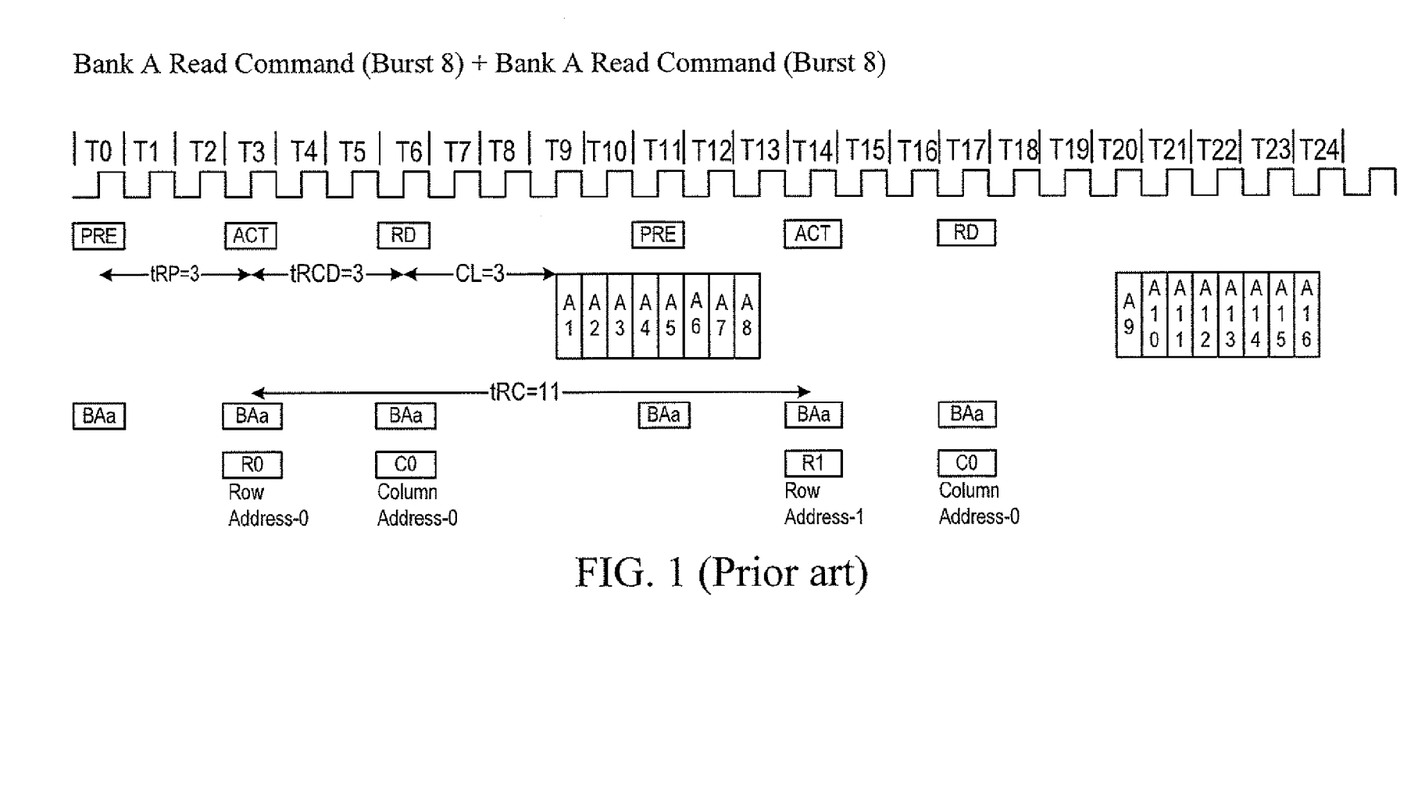
FIG. 1 is a schematic diagram of accessing different pages in a typical DDR (Double data rate) DRAM access command.

FIG. 1 is a schematic diagram of accessing different pages in typical DDR (Double data rate) DRAM read commands. It accesses twice at Bank-A of DRAM component, and the length of each access is burst-8. At the time T0, a memory controller outputs a precharge command into Bank-A of the DRAM. The memory controller outputs an active command into Bank-A of the DRAM at the time T3 after three clocks. These three clocks are determined based on tRP=3 in the specification of the DDR DRAM. The memory controller outputs a read command into Bank-A of the DRAM at the time T6 after three clocks. These three clocks are also determined based on tRCD=3 in the specification of the DDR DRAM. After three clocks (CL=3), at the time T9, the DRAM component outputs corresponding data (A1-A8) into its data bus. Since the second DRAM read command is proceeded to access different pages in Bank-A of the memory, the memory controller outputs a new precharge command into the DRAM at the time T11, and outputs an active command at the time T14. The timing of active commands in identical bank is determined by tRC=11 in the DDR SDRAM specification. As shown in FIG. 1, at the time T19, the memory outputs corresponding data (A9-A16) into its data bus (DDR DRAM DQ Signals), and it needs totally twenty-four clock cycles to complete two burst-8 DRAM read commands. It is obvious that this method of memory access is time-wasting and ineffective.

Figure 2:
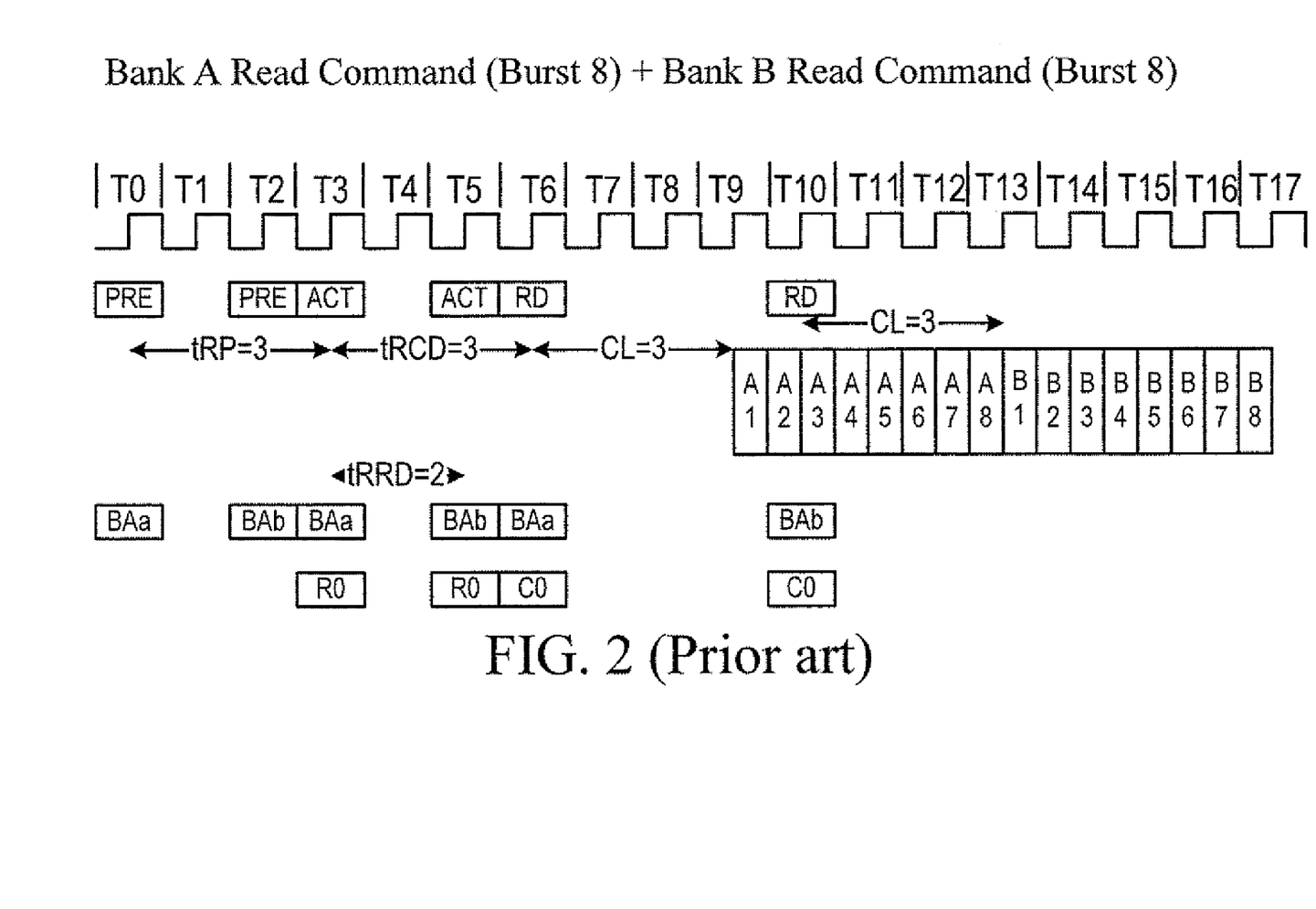
FIG. 2 is a schematic diagram of prior accessing different page of DDR SDRAM memory by interleaving algorithm.

To overcome the aforementioned problem, FIG. 2 is a schematic diagram of prior accessing for DDR memory by interleaving algorithm. It separately proceeds to access for Bank-A and Bank-B of DRAM component, and the burst length of each access is burst-8. At the time T0, a memory controller outputs a precharge command into Bank-A of the DRAM component. At the time T2, a memory controller outputs a precharge command into Bank-B of the DRAM component. At the time T3, the memory controller outputs an active command into Bank-A of the DRAM component. At the time T5, the memory controller outputs an active command into Bank-B of the DRAM component, this active command and previous active command belong to different banks, so it is not limited to tRC=11 in the DDR DRAM specification. At the time T6, the memory controller outputs a read command into Bank-A of the DRAM component. At the time T9, Bank-A of the memory outputs read data (A1-A8) into its data bus. At the time T10, the memory controller outputs a read command into Bank-B of the DRAM component. After three clocks (CL=3), at the time T13, the memory outputs the read data (B1-B8) into its data bus, and it needs totally eighteen clock cycles to complete two burst-8 DRAM read commands. Although this method saves several clocks in comparison with the method in FIG. 1, memory controller needs to service a serial memory access requests from all system bus masters. Normally, there are no relationships between previous memory command and next memory command because they are from different system bus masters. The bank-interleave mechanism can not be applied to all DRAM commands of a serial memory access request and it is based on the possibility of permutation of memory access request. In the case, the memory controller can't provide maximal DRAM bandwidth to a computer system. For a 2-bank DRAM, the possibility of same DRAM bank and different page (row address) with previous DRAM command request and the next DRAM command request is around fifty percent. Therefore, there is a need for the above memory access control system to be improved.

SUMMARY OF THE INVENTION

The object of the present invention is to provide a control system for accessing synchronous DRAM memory, so as to reduce memory access latency and raise the memory bandwidth to near the maximal number of the DRAM component in a computer system.

Another object of the invention is to provide a control system mechanism for accessing synchronous DRAM memory, so as to generate a plurality of DRAM commands, which are belonged to different DRAM bank, and access the DRAM by interleaving mechanism to achieve maximization of the system performance.

According to a feature of the invention, a control system for memory access is provided, which comprises: a system memory access command buffer, for temporarily storing a plurality of system memory access commands; a memory access command parallel processor, connected to the system memory access command buffer, for fetching and decoding the system memory access commands respectively to a plurality of DRAM access commands, temporarily storing the DRAM access commands in DRAM bank command FIFOs, and performing a process of priority setting for the DRAM access commands according to a DRAM bank priority table; a DRAM command controller, connected to the memory access command parallel processor and a DRAM, for receiving the DRAM access commands with the process of priority, and sending control commands accessed by the DRAM to the DRAM according to the order of the DRAM access commands received; and a read data buffer, connected to the DRAM command controller and the system bus, for temporarily storing the read data from the DRAM and rearranging a sequence of the read data for the system memory commands.

According to another feature of the invention, a reordering method capable of controlling memory access is provided. The reordering method comprises the steps of: (A) decoding a system memory access command to generate a plurality of DRAM access commands, and temporarily storing the DRAM access commands to DRAM bank command FIFOs, wherein a DRAM bank priority table records access time sequence of the DRAM banks from the DRAM access commands for performing a process of priority setting; (B) judging which one of the DRAM bank command FIFOs has the highest priority by a memory command parallel processor; (C) outputting the DRAM access command from the DRAM bank command FIFO with the highest priority and updating the DRAM bank priority table until the DRAM bank command FIFOs are empty; and (D) going back to step (B) if the DRAM bank command FIFOs from the system memory access command are not empty.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
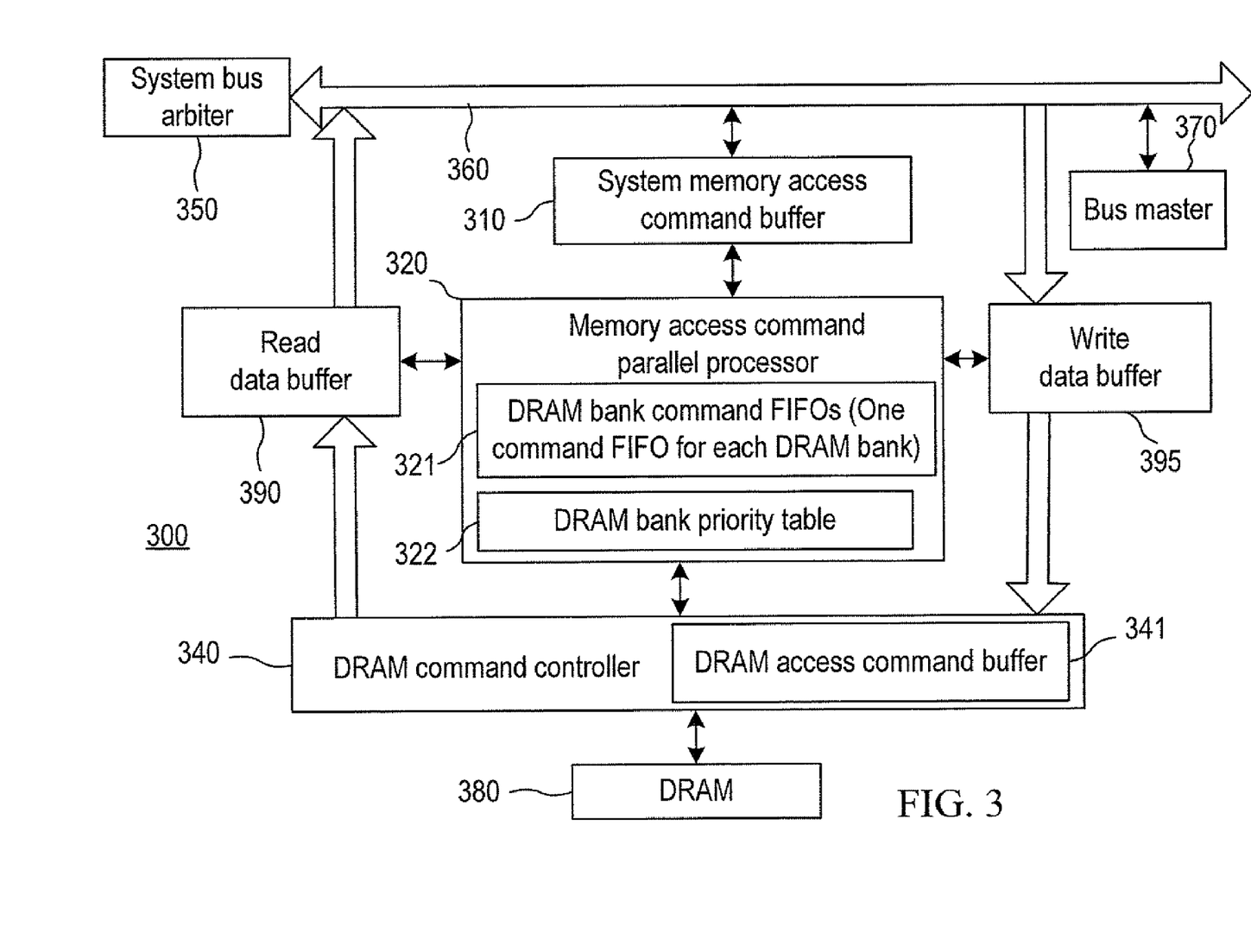
FIG. 3 is a block diagram of a control system for memory access in accordance with the invention.

With reference to FIG. 3, there is shown a control system 300 for memory access in accordance with the invention, which includes a system memory access command buffer 310, a memory access command parallel processor 320, a DRAM command controller 340, a system bus arbiter 350, a read data buffer 390, and a write data buffer 395.

The system bus arbiter 350 receives memory access command request from a system bus master 370 through a system bus 360. The system memory access commands can be linear address mode of memory access commands or two-dimension address mode (start X-Address, Y-Address, X-Length and Y-Length) of memory access commands.

The system memory access command buffer 310 is connected to the system bus 360, in order to temporarily store multiple system memory access commands.

The memory access command parallel processor 320 is connected to the system memory access command buffer 310, in order to decode a system memory access command and then generate multiple DRAM access commands.

Those DRAM access commands are stored in a DRAM bank command FIFO 321 first. There are several DRAM bank command FIFOs for storing DRAM access commands of each bank. When the process of priority setting in DRAM bank command FIFO 321 is performed, the memory access command parallel processor 320 serves a system memory access command as a boundary to perform the process of priority setting for the several DRAM access commands from the current system memory access command. In performing the process of priority setting, a DRAM bank priority table 322 is used to decide the priority of DRAM bank command FIFO 321.

DRAM bank priority table 322 records the order of access time of each DRAM bank, which previous DRAM access commands of the previous system memory access command belong to, and sets up the priority. The process of priority setting is performed according to the DRAM bank priority table 322. The memory bank information has reset state, time-out state, and the priority value.

Further, the DRAM bank priority table 322 records page numbers of the DRAM bank command FIFO 321 from the DRAM access commands. If the page number of the DRAM access commands currently used from the system memory access command is the same as the DRAM bank command FIFO 321 in the DRAM bank priority table 322, the DRAM bank command FIFO 321 currently used has the highest priority.

The DRAM command controller 340 is connected to the memory access command parallel processor 320, in order to fetch DRAM access command from the memory access command parallel processor 320, and receive DRAM access commands. The memory access command parallel processor 320 outputs DRAM access commands from DRAM bank command FIFOs 341 in accordance with the priority of DRAM bank priority table.

The DRAM command controller 340 sends DRAM access commands to DRAM 380 in accordance with the order of DRAM commands in DRAM access command buffer 341.

The read data buffer 390 is connected to the DRAM command controller 340 and the system bus 360, in order to temporarily store the read data from the DRAM 380. The write data buffer 395 is connected to the DRAM command controller 340 and the system bus 360, in order to temporarily store the write data for the DRAM 380.

The memory access command parallel processor 320 proceeds to sort for the data, which is stored in the read data buffer 390 and the write data buffer 395, according to the sorted several DRAM access commands from DRAM access command reordering phase.

Figure 4:
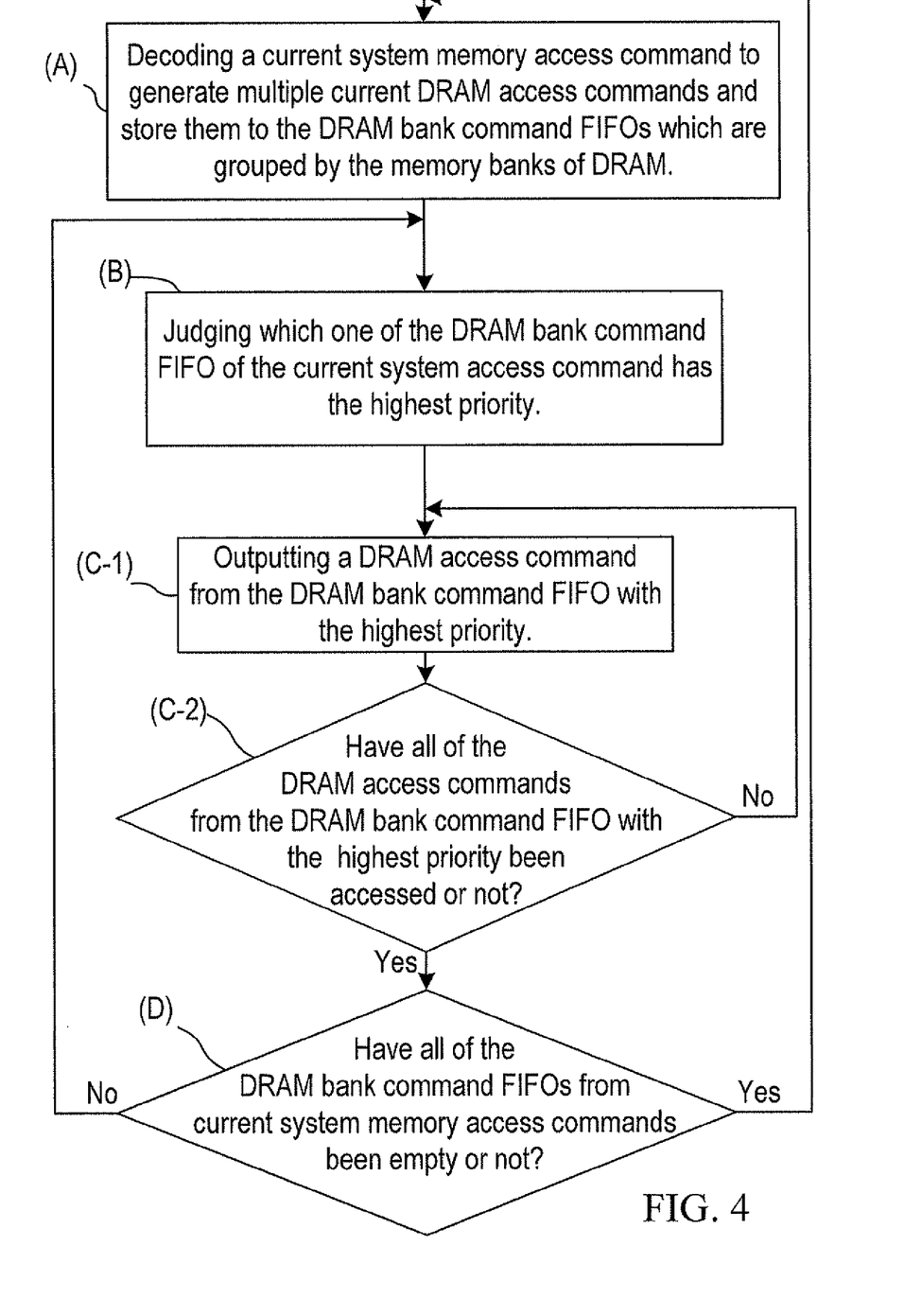
FIG. 4 is a flowchart showing a sorting method of DRAM access commands in accordance with the invention.
Figure 5A:
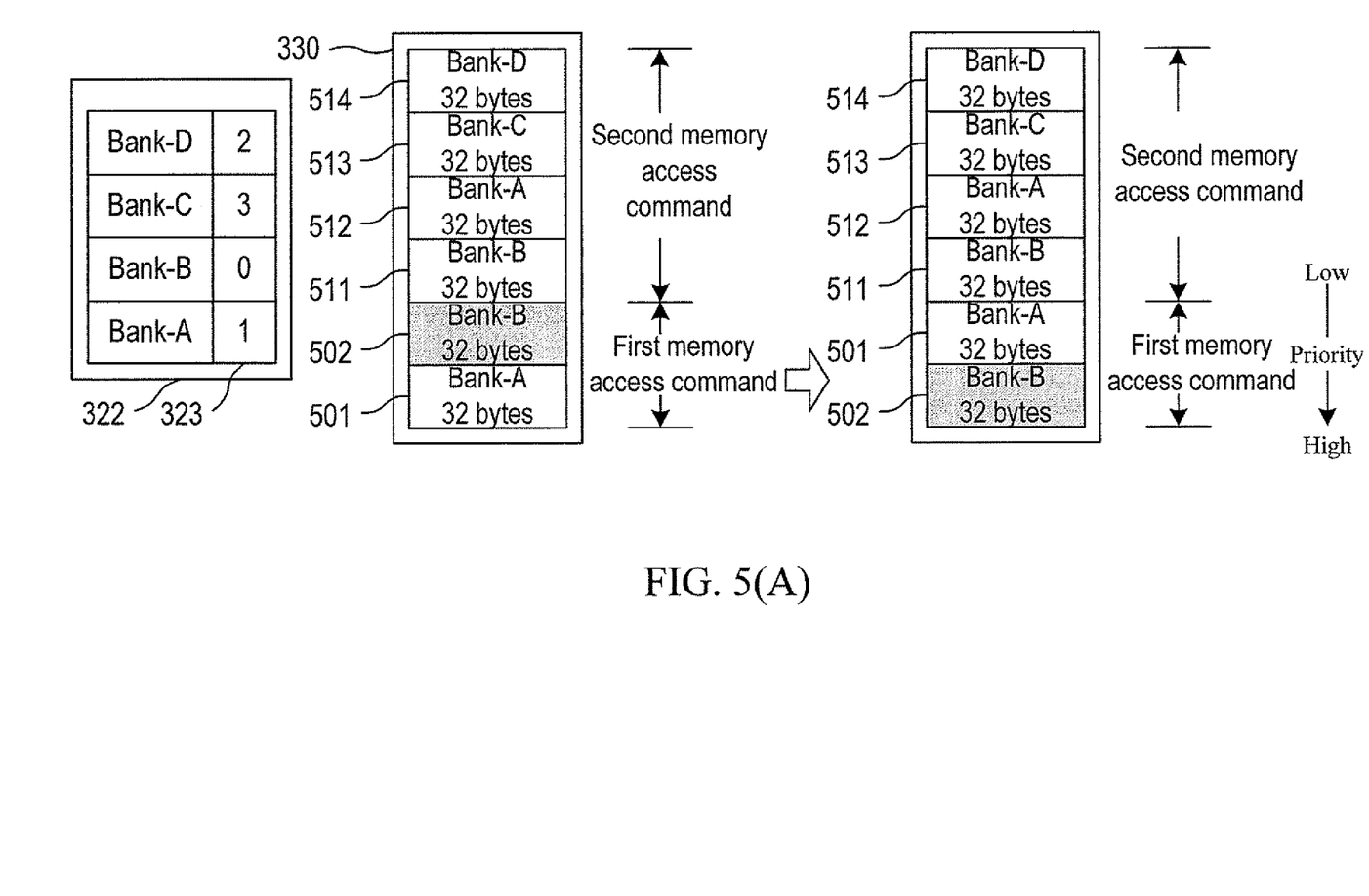
FIG. 5 is a schematic diagram of an embodiment of a sorting method of DRAM access commands in accordance with the invention.

With reference to FIG. 4, there is a sorting method of DRAM access commands in accordance with the invention, which uses a DRAM bank priority table 322 to record the priority of multiple DRAM banks, wherein the priority of each DRAM bank is set up from high to low according to the order of previous using time. Also with reference to FIG. 5, there is shown a sorting method of DRAM access commands with the invention. As shown in FIG. 5 (A), the DRAM bank priority table 322 records the priority 323 of Bank-A to Bank-D in the DRAM component 380, wherein smaller number refers to higher priority, and the priority is set up from high to low according to the sequence of previous using time. Namely, Bank-B is used earlier in the DRAM bank priority table 332, so it has the highest priority.

First, in step (A), the memory access command parallel processor 320 proceeds to decode a system memory access command and then generate the several DRAM access commands, wherein each DRAM access command corresponds to a DRAM bank of the DRAM 380.

As shown in FIG. 5 (A), the memory access command parallel processor 320 stores the several DRAM access commands in the DRAM bank command FIFO 321, which are stored with the DRAM access commands by each DRAM bank respectively.

The first system memory access command is decoded and then generates two DRAM access commands 501, 502, which access 32 bytes from Bank-A and Bank-B. The second system memory access command is decoded to four DRAM access commands 511, 512, 513, 514, which access 32 bytes from Bank-B, Bank-A, Bank-C and Bank-D. At present, data stored in the DRAM bank priority table 322 is the access sequence of each DRAM bank in the previous DRAM access commands. The specification of DRAM has strict time constrain for the different pages of the same DRAM bank access command. On the basis of this property, it is a very important technique to use the information to sort a serial DRAM access command priority.

In step (B), it judges which bank of the DRAM bank command FIFO has highest priority. The judgment in this step depends on the information in the DRAM bank priority table 322.

As shown in FIG. 5 (A), the DRAM access commands 501, 502 are Bank-A 32-byte access command and Bank-B 32-byte access command, and Bank-B is the DRAM access command with the higher priority. It is decided by the DRAM bank priority table 322. Thus, the higher priority of the present DRAM access commands 501, 502 belongs to the DRAM bank-B command FIFO, namely, the method enters step (B) and step (C-1). When the DRAM command controller 340 fetches all of the DRAM commands of Bank-B (step (C-2)), the method re-enters step (B) to choose the next DRAM bank with the highest priority.

Then, DRAM commands in Bank-A command FIFO 501 are belonged to the first system memory access command. Thus, the method re-enters step (B), then automatically chooses Bank-A command FIFO 501 as the next highest DRAM bank command FIFO. The memory access command parallel processor 320 proceeds to sort the DRAM access commands 501, 502 of DRAM bank command FIFO of the first system memory, which is to sort according to the priority status in the DRAM bank priority table 322. When performing the process of priority setting for the multiple DRAM bank command FIFOs from a single system memory access command, the memory access command parallel processor 320 serves one system memory access command as a boundary to perform the process of priority setting for the several DRAM bank command FIFOs 501, 502 from the first system memory access command. Namely, after performing the process of priority setting for the several DRAM bank command FIFO 501, 502 from the first system memory access command, the memory access command parallel processor 320 performs the process of priority setting for the several DRAM bank command FIFOs 511, 512, 513, 514 from the second system memory access command.

Since the priority of Bank-B is higher than the priority of Bank-A in the DRAM bank priority table 322, when the memory access command parallel processor 320 performs the process of priority setting, the priority of DRAM bank command FIFO 502 is higher than DRAM bank command FIFO 501.

Figure 5B:
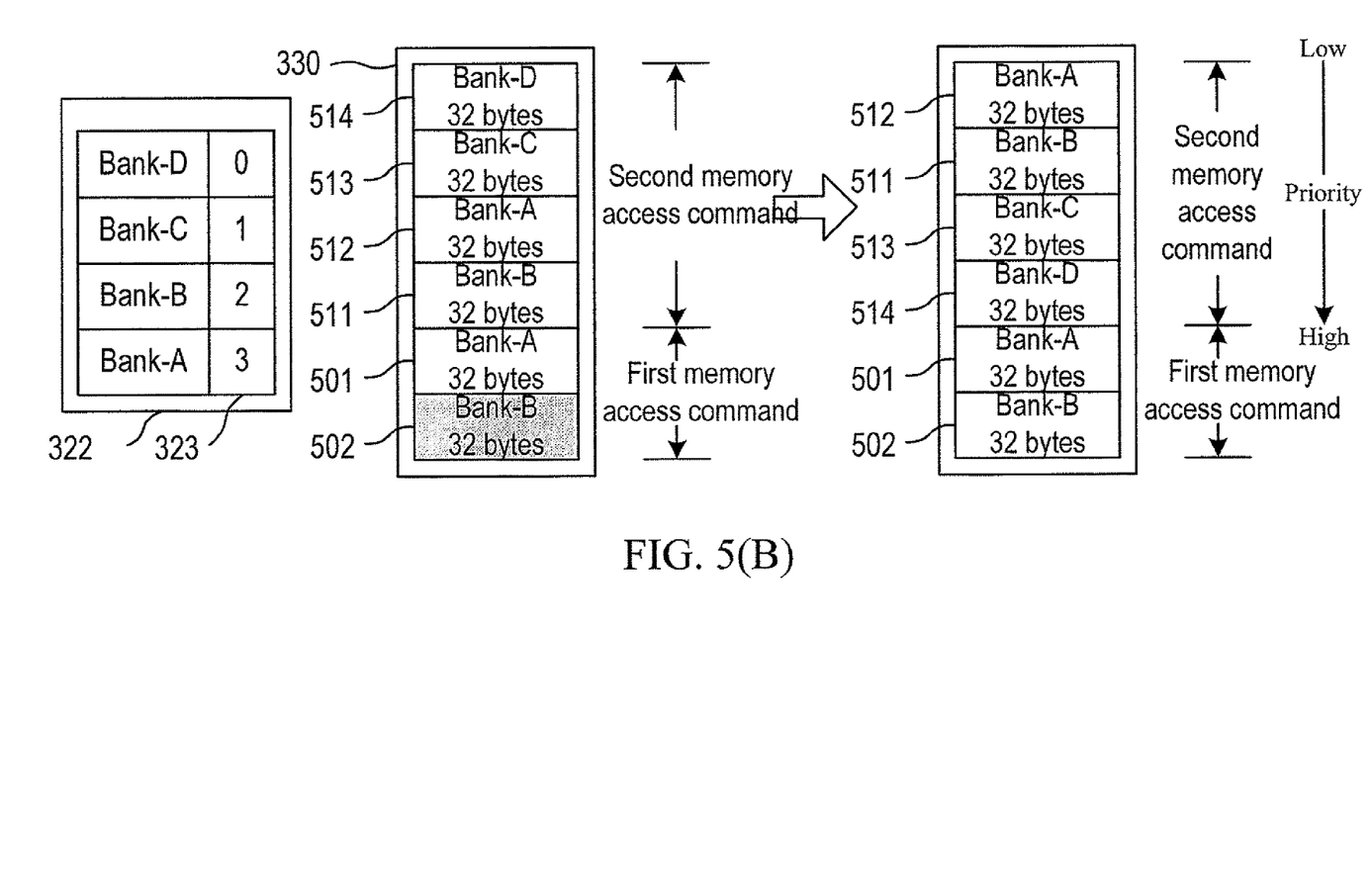

After the process of priority setting of the DRAM bank command FIFO from first system memory access command is completed, the memory access command parallel processor 320 will update the priority information in the DRAM bank priority table 322. Meanwhile, as shown in FIG. 5 (B), Bank-D becomes the earliest DRAM bank being used. Therefore, Bank-D of DRAM bank command FIFO is the DRAM bank with the highest priority.

The second system memory access command is decoded to generate the DRAM bank command FIFOs 511, 512, 513, 514, for accessing 32 bytes to Bank-B, Bank-A, Bank-C, and Bank-D. The memory access command parallel processor 320 performs the process of priority setting for the several DRAM bank command FIFOs 511, 512, 513, 514 of the second system memory access command. In the DRAM bank priority table 322, the priority information/value from high to low is Bank-D, Bank-C, Bank-B, and Bank-A, respectively. As shown in FIG. 5 (B), after the process of priority setting performed by the memory access command parallel processor 320, the priority of the DRAM bank command FIFO 514 is the highest, the next highest one is the DRAM bank command FIFO 513, and the next is the DRAM bank command FIFO 511, while the priority of the DRAM bank command FIFO 512 is the lowest of the second system memory access command.

Figure 6:
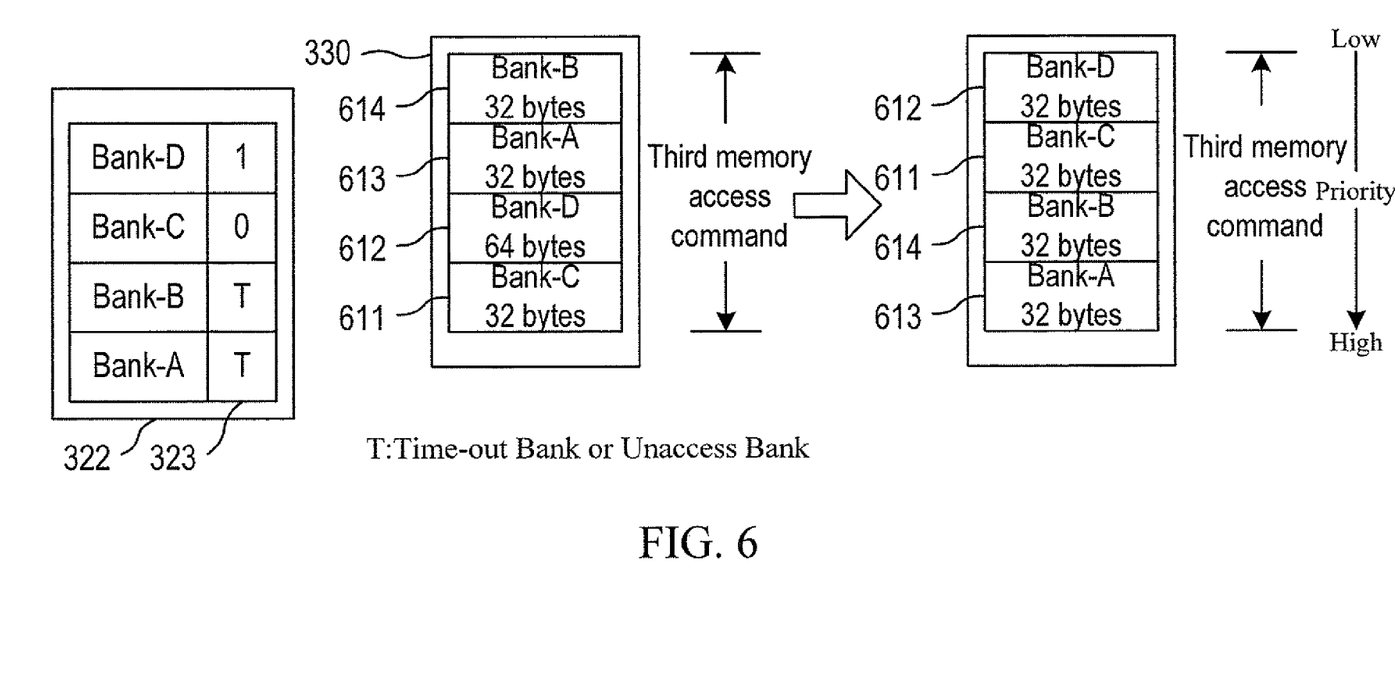
FIG. 6 is a schematic diagram of another embodiment of a sorting method of DRAM access commands in accordance with the invention.

With reference to FIG. 6, there is shown another embodiment of a sorting method of DRAM access commands with the invention. As shown in FIG. 6, the DRAM bank priority table 322 only records the priorities of Bank-C and Bank-D. Since Bank-A and Bank-B have not been accessed before, their priority fields are recorded with "T" to indicate that they are time-out or have not been accessed before. At present, it represents that Bank-A and Bank-B have the highest priority, and therefore either Bank-A or Bank-B can be chosen first.

The memory access command parallel processor 320 proceeds to decode the third memory access command to generate corresponding several DRAM access commands 611, 612, 613, 614 respectively, and temporarily store the several DRAM access commands 611, 612, 613, 614 in the DRAM bank command FIFOs 321, wherein the order in accordance with the result of performing the process of priority setting for DRAM banks is Bank-A, Bank-B, Bank-C, and Bank-D, respectively.

As shown in FIG. 6, the several DRAM access commands 613, 614 access 32 bytes to Bank-C and Bank-D. It is assumed that the following DRAM access commands of Bank-C and Bank-D are the same page with previous DRAM command respectively. The information is recorded in the DRAM bank priority table 322. Therefore, the following DRAM access commands of Bank-C and Bank-D do not need to issue DRAM Precharge command and DRAM Active command, and thus, the present DRAM access commands 613, 614 could belong to the highest priority, wherein both Bank-C or Bank-D can be chosen first.

Figure 7:
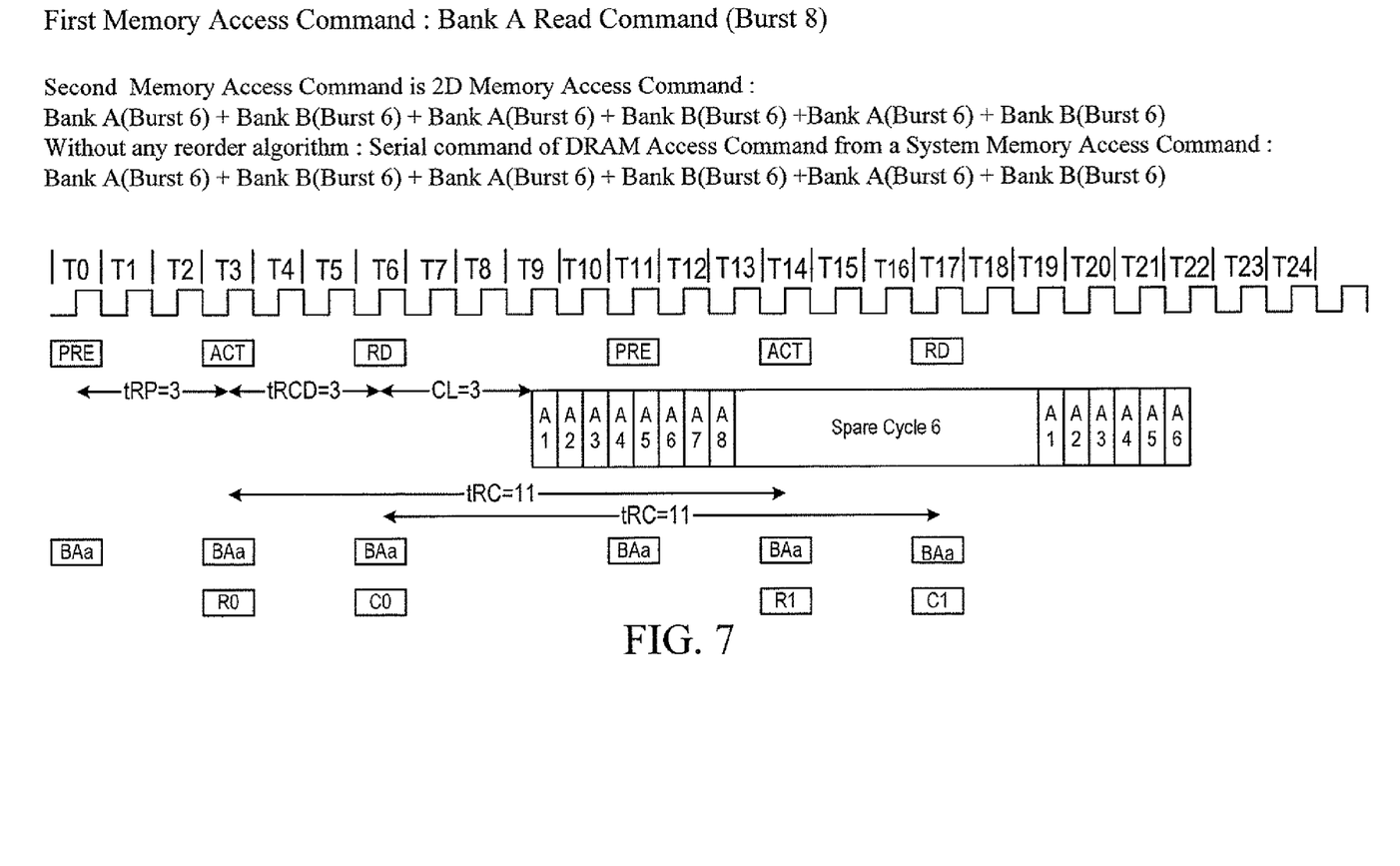
FIG. 7 is a schematic diagram of DRAM access command result without any reordering/priority process from a system memory access commands.
Figure 8:
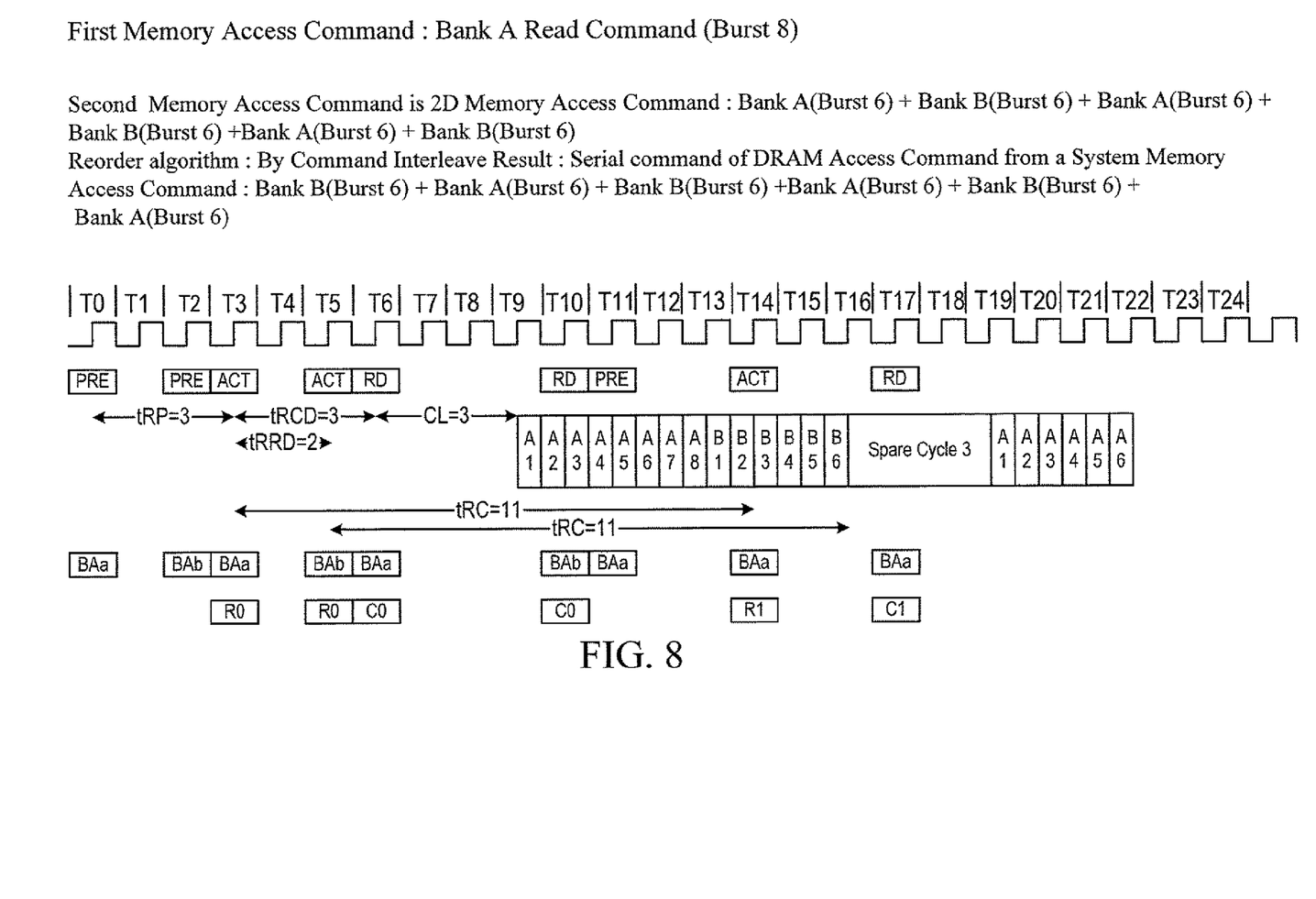
FIG. 8 is a schematic diagram of an embodiment of a sorting method of DRAM access commands from a system memory access command.
Figure 9:
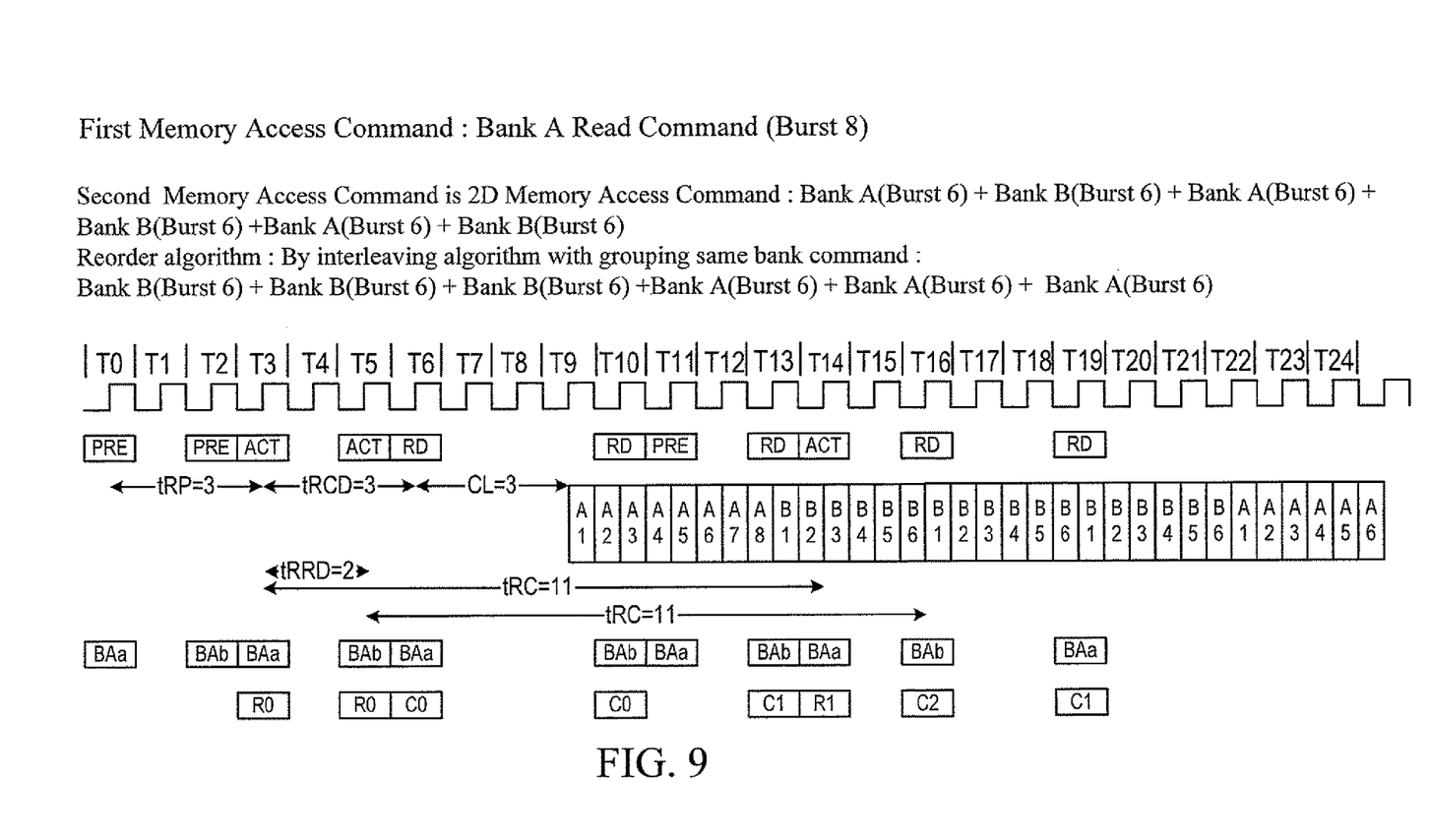
FIG. 9 is a schematic diagram of another embodiment of a sorting method of DRAM access commands in accordance with the invention.

As shown in FIG. 7, there is another embodiment of the result of DRAM access without using rearranged DRAM access commands. As shown in FIG. 8, there is another embodiment of the DRAM access result sorting by using prior technical algorithm. As shown in FIG. 9, there is another embodiment of the result of DRAM access sorted by the algorithm with the invention.

In other embodiments, when the DRAM access command parallel processor 320 performs the priority process for the DRAM bank command FIFO, it also can sort according to the amount of access bytes of the DRAM access commands in each DRAM bank command FIFO when there are more than one bank FIFO at time-out state.

As cited above, prior techniques do not disclose how to sort DRAM access commands to get lower latency. However, in the invention, the memory access command parallel processor 320 depends on the priority in the DRAM bank priority table 322 to reorder DRAM access commands which access the DRAM 380 by interleaving algorithm, so as to reduce delay and raise total DRAM bandwidth of the computer system.

Therefore, in the aspect of objectives, methods and effects, the characters of the invention are different from the prior art, and the invention extremely has worth practicality. It only should be noted that, although the present invention has been explained in relation to its preferred embodiment, it is to be understood that many other possible modifications and variations can be made without departing from the scope of the invention as hereinafter claimed.

What is claimed is:

1. A control system for memory access, comprising:
    a system memory access command buffer, for temporarily storing a plurality of system memory access commands;
    a memory access command parallel processor, connected to the system memory access command buffer, for fetching and decoding the system memory access commands respectively to a plurality of DRAM access commands, temporarily storing the DRAM access commands in DRAM bank command FIFOs, and performing a process of priority setting for the DRAM access commands according to a DRAM bank priority table;
    a DRAM command controller, connected to the memory access command parallel processor and a DRAM, for receiving the DRAM access commands with the process of priority, and sending control commands accessed by the DRAM to the DRAM according to the order of the DRAM access commands received; and
    a read data buffer, connected to the DRAM command controller and the system bus, for temporarily storing read data from the DRAM and rearranging a sequence of the read data for the system memory commands.

2. The control system for memory access as claimed in claim 1, further comprising:
    a system bus arbiter, for receiving memory access commands from system bus masters, and generating the system memory access commands correspondingly.

3. The control system for memory access as claimed in claim 1, further comprising:
    a write data buffer, connected to the DRAM command controller and the system bus, for temporarily storing write data for writing into the DRAM.

4. The control system for memory access as claimed in claim 1, wherein the system memory access commands are a linear address mode or a two-dimension address mode.

5. The control system for memory access as claimed in claim 1, wherein the memory access command parallel processor uses the system memory access command currently for boundary to perform the process of priority setting for the DRAM access commands.

6. The control system for memory access as claimed in claim 5, wherein the DRAM is a type of synchronous DRAM.

7. The control system for memory access as claimed in claim 6, wherein the synchronous DRAM comprises a plurality of memory banks.

8. The control system for memory access as claimed in claim 1, wherein the memory access command parallel processor further comprises the DRAM bank priority table for recording a sequence of memory banks accessed by the DRAM access commands from the system memory access commands.

9. The control system for memory access as claimed in claim 8, wherein the DRAM bank priority table records access time sequence of the memory banks from the DRAM access commands for performing the process of priority setting.

10. The control system for memory access as claimed in claim 9, wherein if there is no said system memory access command accessing the memory bank after a predetermined time, the memory access command parallel processor sets up the memory bank as a time-out memory bank, wherein the memory access command parallel processor sets up the time-out memory bank with the highest priority when there is a DRAM command proceeding to access the time-out memory bank.

11. The control system for memory access as claimed in claim 9, wherein the DRAM bank priority table records page numbers of the DRAM bank command FIFO from the DRAM access commands, and if the page number of the DRAM access commands currently used from the system memory access command is the same as the DRAM bank command FIFO in the DRAM bank priority table, the DRAM bank command FIFO currently used has the highest priority.

12. A reordering method capable of controlling memory access, the reordering method comprising the steps of:
    (A) decoding a system memory access command to generate a plurality of DRAM access commands, and temporarily storing the DRAM access commands to DRAM bank command FIFOs, wherein a DRAM bank priority table records access time sequence of the DRAM banks from the DRAM access commands for performing a process of priority setting;
    (B) judging which one of the DRAM bank command FIFOs has the highest priority by a memory command parallel processor;
    (C) outputting the DRAM access command from the DRAM bank command FIFO with the highest priority and updating the DRAM bank priority table until the DRAM bank command FIFOs are empty; and
    (D) going back to step (B) if the DRAM bank command FIFOs from the system memory access command are not empty.

13. The reordering method as claimed in claim 12, wherein the DRAM bank priority table records page numbers of the DRAM bank command FIFO from the DRAM access commands, and if the page number of the DRAM access commands currently used from the system memory access command is the same as the DRAM bank command FIFO in the DRAM bank priority table, the DRAM bank command FIFO currently used has the highest priority.

14. The reordering method as claimed in claim 12, wherein the DRAM is a type of synchronous DRAM.

* * * * *